US008422680B2

(12) United States Patent
Kruegel et al.

(10) Patent No.: US 8,422,680 B2
(45) Date of Patent: Apr. 16, 2013

(54) METHOD FOR VALIDATING ENCRYPTED COMMUNICATIONS VIA SELECTION AND COMPARISON OF SOURCE TRANSMITTER AND DESTINATION RECEIVER ASSOCIATED ENCRYPTION KEYS

(75) Inventors: Chris A. Kruegel, Plainfield, IL (US); David J. Chater-Lea, Crowthorne (GB)

(73) Assignee: Motorola Solutions, Inc., Schaumburg, IL (US)

(*) Notice: Subject to any disclaimer, the term of this patent is extended or adjusted under 35 U.S.C. 154(b) by 1303 days.

(21) Appl. No.: 12/030,441

(22) Filed: Feb. 13, 2008

(65) Prior Publication Data

US 2010/0031038 A1 Feb. 4, 2010

(51) Int. Cl.
*H04K 1/02* (2006.01)
*H04L 9/00* (2006.01)
*G06F 12/14* (2006.01)

(52) U.S. Cl.
USPC .................. 380/277; 380/255; 713/189

(58) Field of Classification Search .................. None
See application file for complete search history.

(56) References Cited

U.S. PATENT DOCUMENTS

| 4,440,976 | A | * | 4/1984 | Bocci et al. ............. 380/277 |
| 5,541,997 | A | * | 7/1996 | Pappas et al. ........... 380/271 |
| 5,557,346 | A | * | 9/1996 | Lipner et al. ............ 380/286 |
| 5,574,785 | A | * | 11/1996 | Ueno et al. ............. 380/2 |
| 5,619,572 | A | * | 4/1997 | Sowa .................. 380/273 |
| 7,082,536 | B2 | | 7/2006 | Filipi-Martin et al. |
| 7,188,242 | B2 | * | 3/2007 | Itkis ................. 713/161 |
| 2002/0112168 | A1 | * | 8/2002 | Filipi-Martin et al. ....... 713/183 |
| 2005/0278524 | A1 | * | 12/2005 | Diehl et al. ............ 713/150 |
| 2007/0186105 | A1 | * | 8/2007 | Bailey et al. ........... 713/168 |
| 2008/0019525 | A1 | | 1/2008 | Kruegel |
| 2009/0043562 | A1 | * | 2/2009 | Peshave et al. ............ 704/2 |
| 2009/0327714 | A1 | * | 12/2009 | Yaghmour ............. 713/168 |

FOREIGN PATENT DOCUMENTS

| EP | 1376924 A2 | 1/2004 |
| EP | 1826984 A1 | 8/2007 |
| GB | 2417173 A * | 2/2006 |
| WO | 2007071041 A1 | 6/2007 |
| WO | 2009056679 A2 | 5/2009 |

OTHER PUBLICATIONS

ETS 300 392-7, Dec. 1996, ETSI, pp. 1, 19-20.*

(Continued)

*Primary Examiner* — Matthew Henning
(74) *Attorney, Agent, or Firm* — Terri H. Smith; Daniel R. Bestor

(57) ABSTRACT

A first communication unit receives an encrypted transmission from a second communication unit. The encrypted transmission was encrypted by the second communication unit using a first encryption key. The first communication unit compares the first encryption key to an encryption key associated with the first communication unit. If the first encryption key matches the encryption key associated with the first communication unit, the first communication unit processes the encrypted transmission further. If the first encryption key does not match the encryption key associated with the first communication unit, the first communication unit compares the first encryption key to an encryption key associated with the second communication unit. If the first encryption key matches the encryption key associated with the second communication unit, the first communication unit processes the encrypted transmission further; otherwise, the first communication unit does not process the encrypted transmission further.

16 Claims, 2 Drawing Sheets

OTHER PUBLICATIONS

International Search Report and Written Opinion for International Application No. PCT/US2009/033852 mailed on Dec. 29, 2009.
Parkinson D. W., "Tetra Security," BT Technology Journal, Springer, Dordrecht, NL, Jul. 1, 2001, pp. 81-88, vol. 19, No. 3.

International Preliminary Report on Patentability for International Application No. PCT/US2009/033852 mailed on Aug. 26, 2010.
English language translation of Office Action issued on Sep. 13, 2012 in counterpart Chinese Patent Application No. 200980104866.4.

* cited by examiner

METHOD FOR VALIDATING ENCRYPTED COMMUNICATIONS VIA SELECTION AND COMPARISON OF SOURCE TRANSMITTER AND DESTINATION RECEIVER ASSOCIATED ENCRYPTION KEYS

FIELD OF THE DISCLOSURE

This disclosure relates generally to encrypted communication systems, and more particularly, to a method to allow communication units to interoperate securely even when the uses of encryption keys are provisioned differently.

BACKGROUND OF THE DISCLOSURE

Police and public safety personnel, as well as private organizations, often rely on wireless mobile and portable radios to convey voice and data in an efficient, reliable manner. Much of this communication occurs on open, clear, unencrypted channels. Open communications, however, are subject to eavesdropping and other interference and at times it is necessary to limit the information exchanged to a select group or individual. To this end, secure methods of communications are necessary. Secure communication systems for mobile and portable radios are well known.

Secure communication is possible by encrypting the audio, visual, and/or data ("transmission") that is transmitted. Encryption keys are used to encrypt the transmission. Communication units having identical encryption keys, i.e. symmetric encryption keys, and encryption algorithms are capable of forming and decoding encrypted transmissions.

A communication unit may be provided with a set or multiple sets of keys to allow practical key management. The set of encryption keys may be referred to as a Cryptogroup, as is known in the Trans-European Trunked Radio service (TETRA) system, or as a Storage Location Number, as is known in the Association of Public Safety Communication Officers (APCO) Project 25 system defined by the Association of Public-Safety Communications Officials, and may also include other key management groups or systems now known or hereafter created that describes a key or a set of encryption keys.

The communication unit is assigned a key within the set of keys for transmissions, but may use any of the keys within the set of keys used for that transmission for reception. This allows the keys within the set to be changed over time, and new keys assigned for transmission in a communication unit without loss of communication with other communication units that may receive newly assigned keys at slightly different times. A set of keys may contain only one encryption key, or may contain more, with typical numbers of encryption keys being two or three. For simplicity, single as well as groups of encryption keys hereafter will be referred to as "encryption keys" or "key" and understood to incorporate both individual as well as sets or groups of keys.

Each individual communication unit may have more than one encryption key. For example, it is frequently desirable for supervisory radios to have several different encryption keys to communicate with different groups of users, each having different encryption keys. In this instance, multiple encryption keys allow the supervisory radio to have secured communications with different groups of users who each may have different encryption keys. Keys may be associated with the addresses of different groups or users to determine which key a user should use when initiating a transmission. A key may be designated 'default' for use where no other specific key has been associated with an address.

There are concerns, however, when a receiving communication unit has multiple encryption keys. The receiving communication unit must first validate the transmitting communication unit of the transmission to verify that it is from a trusted source. Currently, the receiving communication unit validates the transmission by one of two methods. In the first method, the receiving communication unit validates the transmission using a particular group of keys provisioned in the receiving communication unit. The transmissions received are limited to the group the receiving communication unit searches. If a transmission is received that is from a communication unit using a key outside the set searched, the transmission is not processed. In the second method, the receiving communication unit validates the transmission against all encryption keys with which it has been provisioned. This method, however, opens the receiving communication unit to spoofing attacks by unauthorized communication units.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

Figure 1:
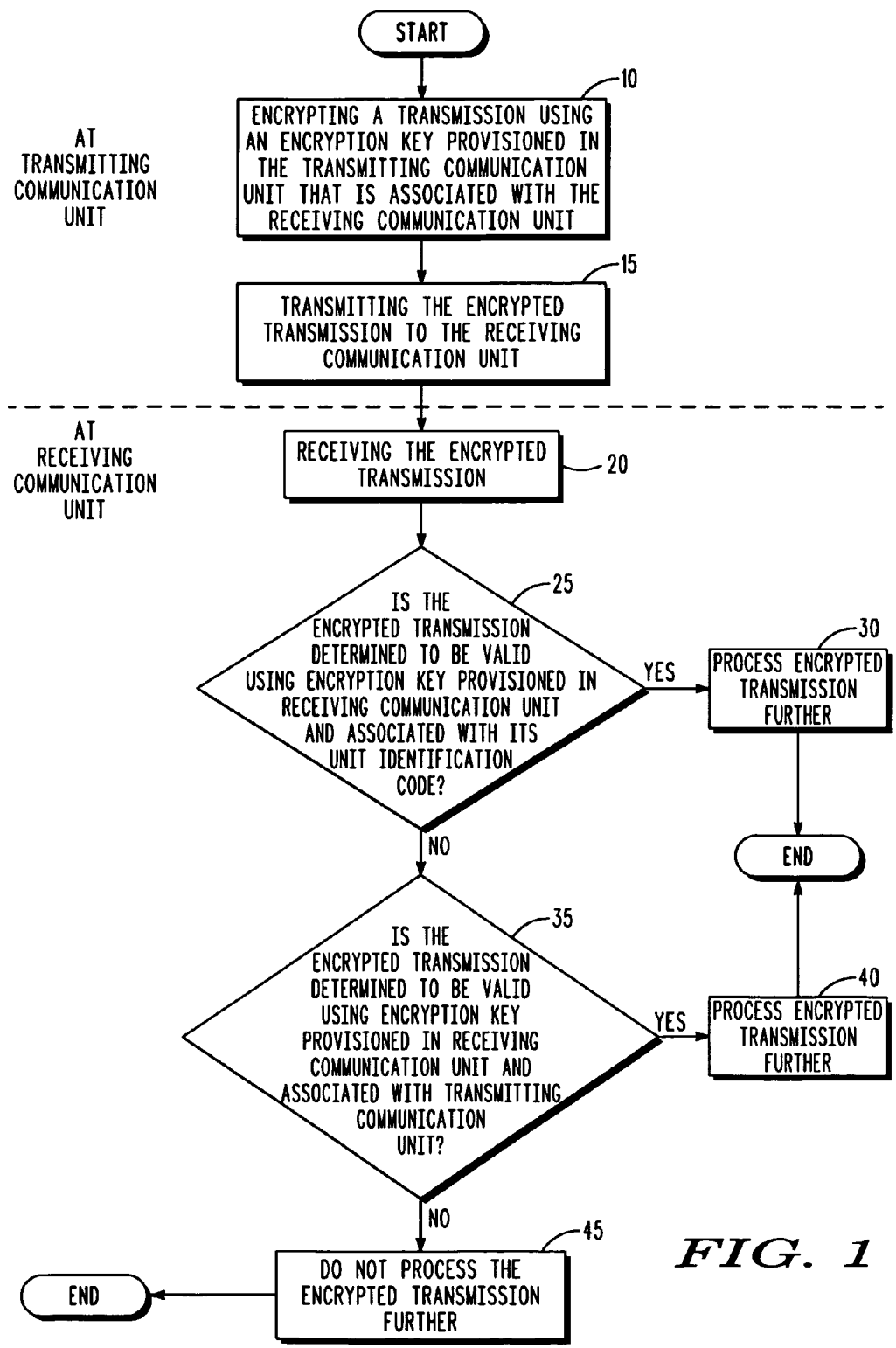
FIG. 1 is a flow chart to allow the transmitting and receiving communication units to communicate securely in accordance with the present disclosure.

Skilled artisans will appreciate that elements in the figures are illustrated for simplicity and clarity and have not necessarily been drawn to scale. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will be understood that the terms and expressions are used with respect to their corresponding respective areas of inquiry and study except where specific meaning have otherwise been set forth herein.

DETAILED DESCRIPTION OF THE DISCLOSURE

A method to allow communication units to communicate securely even when the uses of encryption keys are provisioned differently is disclosed. In accordance with the present disclosure, the term "provisioned" means providing to a communication unit an encryption key along with a corresponding association of the encryption key with a communication unit or group of communication units prior to communications between the communication units taking place. For ease of explanation, it should also be noted that the use of the term "encryption key" includes one or more encryption keys, and thus, encryption key and encryption keys are used interchangeably. In an embodiment of the present disclosure, a transmitting communication unit encrypts a transmission (audio, visual, and/or data) using an encryption key the transmitting communication unit believes is associated with the receiving communication unit (e.g., in TETRA, the transmitting communication unit uses an encryption key that is part of the Cryptogroup associated with the receiving communication unit).

Upon receipt of the encrypted transmission, the receiving communication unit attempts to validate the encrypted transmission by proving that the transmitting communication unit is using an encryption key provisioned in the receiving communication unit to be valid for transmissions received from the transmitting communication unit. Thus, the receiving communication unit compares the encryption key used by the transmitting communication unit to encrypt the transmission to an encryption key associated with its own unit identification code (i.e., an encryption key associated with itself) and, if necessary, to an encryption key associated with the unit identification code of the transmitting communication unit, as provisioned in the receiving communication unit. A unit identification code may be an individual short subscriber identity ("ISSI") as is known in a TETRA system, or a Subscriber Unit Identifier ("SUID") as is known in a Project 25 system, or may refer to any other suitable form of identification of an individual communication unit or group of communication units. For clarity, reference made to the encryption key associated with a communication unit, the encryption key being associated with the unit identification code of the communication unit, or the like, are used interchangeably throughout the disclosure. Thus, the receiving communication unit considers valid the encryption key used by the transmitting communication unit to encrypt the transmission if it matches an encryption key associated with itself or the transmitting communication unit as provisioned in the receiving communication unit.

In accordance with the present disclosure, if the receiving communication unit determines that the encryption key used by the transmitting communication unit to encrypt the transmission matches an encryption key associated with the receiving communication unit, then the receiving communication unit is able to process the transmission further, if it so chooses. In other words, even if the encryption key used by the transmission communication unit is valid, the receiving communication unit may be provisioned to not respond to the transmitting communication unit and/or to mute the transmission. Thus, it should be noted that processing the encrypted transmission comprises at least one of decrypting the encrypted transmission, unmuting the encrypted transmission, indicating a presence of an encrypted transmission, awaiting input from a user before processing the encrypted transmission further, awaiting input from an application before processing the encrypted transmission further, or muting the encrypted transmission. If, however, the receiving communication unit determines that the encryption key used by the transmitting communication unit does not match an encryption key associated with the receiving communication unit, the receiving communication unit attempts to validate the encrypted transmission by comparing the encryption key used by the transmitting communication unit to an encryption key associated with the transmitting communication unit, as provisioned in the receiving communication unit. If the receiving communication unit determines that the encryption key used by the transmitting communication unit to encrypt the transmission matches an encryption key associated with the transmitting communication unit, the receiving communication unit is able to process the transmission further, if it so chooses. If, however, the receiving communication unit determines that the encryption key used by the transmitting communication unit does not match an encryption key it has associated with the transmitting communicating unit, or if the receiving communication unit is not provisioned with an encryption key associated with the transmitting communication unit, the receiving communication unit does not process the transmission further (i.e., mutes and/or discards the encrypted transmission).

Thus, the receiving communication unit attempts to validate the encrypted transmission by proving that the transmitting communication unit is using the correctly associated encryption key. The receiving communication unit only compares the encryption key used by the transmitting communication unit to encrypt the transmission to the encryption key it has associated with itself and encryption key it has associated with the transmitting communication unit. In other words, a receiving communication unit receives an encrypted transmission from a transmitting communication unit, wherein the encrypted transmission was encrypted by the transmitting communication unit using a first encryption key. The receiving communication unit compares the first encryption key to an encryption key it has associated with itself. If the first encryption key matches the encryption key it has associated with itself, the receiving communication unit processes the encrypted transmission further. If, however, the first encryption key does not match the encryption key it has associated with itself, the receiving communication unit compares the first encryption key to an encryption key it has associated with the transmitting communication unit. If the first encryption key matches the encryption key it has associated with the transmitting communication unit, the receiving communication unit processes the encrypted transmission further; otherwise, the receiving communication unit does not process the encrypted transmission further. As a result, the present disclosure allows the receiving communication unit to search only a limited number of provisioned encryption keys without denying permission to authorized callers. It should be noted that the receiving communication unit does not attempt to validate the encrypted transmission by comparing the encryption key used by the transmitting communication unit to all of the encryption keys with which it is provisioned.

Optionally, for encryption of transmissions in direct mode, conventional mode, or trunked mode between a transmitting communication unit and a receiving communication unit, the transmitting communication unit may concurrently transmit an identifier relating to the encryption key along with the encrypted transmission. The identifier allows the receiving communication unit to determine the encryption key that has been used to encrypt the transmission. In other words, the receiving communication unit compares the identifier against a stored value in the receiving communication unit without needing to attempt a trial decryption.

Moreover, two different encryption keys could be used for a communication. For example, a first encryption key may be used for encrypting transmissions from a first communication unit to a second communication unit, and a second encryption key may be used for encrypting transmissions from the second communication unit to the first communication unit, as the meaning of "transmitting communication unit" differs in each direction. Furthermore, the receiving and transmitting encryption modes do not have to match; an initial transmission could be encrypted, but a response transmission could be unencrypted or clear.

The present disclosure allows communication units to securely communicate with each other even when the uses of encryption keys are provisioned differently, thus enabling interoperability between different organizations, groups, or users within a certain group. Additionally, the present disclosure allows transmissions to be free from interference by owners or operators of the system infrastructure that might be able to intercept the transmission, misdirect or otherwise interfere with the transmission.

Referring now to FIG. 1, a flow chart exemplifying when the uses of encryption keys are provisioned differently in communication units in accordance with the present disclosure is shown. Start block 10 denotes the beginning of a transmission between a transmitting communication unit and a receiving communication unit. The communication units may be mobile or portable wireless radios, cellular radios or telephones, video terminals, portable computers with wireless modems, dispatch consoles or terminals, or other type of wireless communication units. Each communication unit may be configured to operate in half-duplex mode, in which each communication unit is capable of either transmitting or receiving at a given instant, or in full duplex mode, in which case each communication unit is capable of transmitting and receiving simultaneously.

The wireless communication resources used for transmissions between communication units may include, for example, radio frequency technologies, including, but not limited to code division multiple access (CDMA), time division multiple access (TDMA), frequency division multiple access (FDMA) and the like. The present disclosure may also be used in any of the currently available radio frequency communication systems, such as, for example, Global System for Mobile communication (GSM), General Packet Radio Service (GPRS), Universal Mobile Telecommunications Service (UMTS), TETRA, Project 25, Personal Communication Service (PCS), Advanced Mobile Phone Service (AMPS), Integrated Dispatch Enhanced Network (iDEN), and the like. Other wireless technologies may also offer suitable substitutes such as those now known or later to be developed, including, but not limited to, infrared, Bluetooth, electric field, electromagnetic, or electrostatic transmissions.

In FIG. 1, the transmitting communication unit encrypts the transmission using what the transmitting communication unit believes is an encryption key associated with the receiving communication unit at step 10. The transmitting communication unit then transmits the encrypted transmission to the receiving communication unit at step 15.

The encrypted transmission is received by the receiving communication unit at step 20. The receiving communication unit determines whether the encrypted transmission is valid by comparing the encryption key used to encrypt the transmission to an encryption key it has associated with its unit identification code at step 25. If the receiving communication unit determines that the encryption key used to encrypt the transmission matches an encryption key it has associated with its unit identification code (i.e., the encrypted transmission is valid) at step 25, the receiving communication unit is able to process the encrypted transmission further, if it chooses to do so, at step 30.

If, however, the receiving communication unit determines at step 25 that the encryption key used to encrypt the transmission does not match an encryption key it has associated with its own unit identification code, the receiving communication unit determines whether the encrypted transmission is valid using an encryption key it has associated with the transmitting communication unit at step 35.

If the receiving communication unit has been provisioned with an encryption key associated with the transmitting communication unit, and if the encryption key matches the encryption key used to encrypt the transmission, the receiving communication unit is able to process the encrypted transmission further, if it chooses to do so, at step 40. If the receiving communication unit, however, has not been provisioned with the encryption key associated with the unit identification code of the transmitting communication unit, or the encryption key provisioned in the receiving communication unit that is associated with the transmitting communication unit does not match the encryption key used to encrypt the transmission, the receiving communication unit does not process the encrypted transmission further at step 45. It should be noted that both communication units may be provisioned with multiple individual encryption keys, as well as multiple group encryption keys. The receiving communication unit does not scroll through its database of provisioned encryption keys to find an encryption key that matches the encryption key used by the transmitting communication unit to encrypt the transmission.

There may be reluctance by groups in provisioning communication units outside of a group's own communication units with an encryption key that corresponds with the group's own internal encryption key(s) (i.e., an encryption key that is normally used by communication units affiliated with the group). Therefore, it is anticipated that groups will provide an encryption key to outside groups that corresponds to one of their non-internal encryption keys and still allow the two parties to interoperate. For example, a group may be provisioned to associate a certain encryption key with a second group. However, the second group uses a different encryption key when it communicates with communication units within its own group. Provisioning non-member communication units with encryption key(s) different from its own encryption key(s) allows a group to differentiate between communications originating from members of the group and those originating elsewhere, e.g., from non-members outside of the group.

Figure 2:
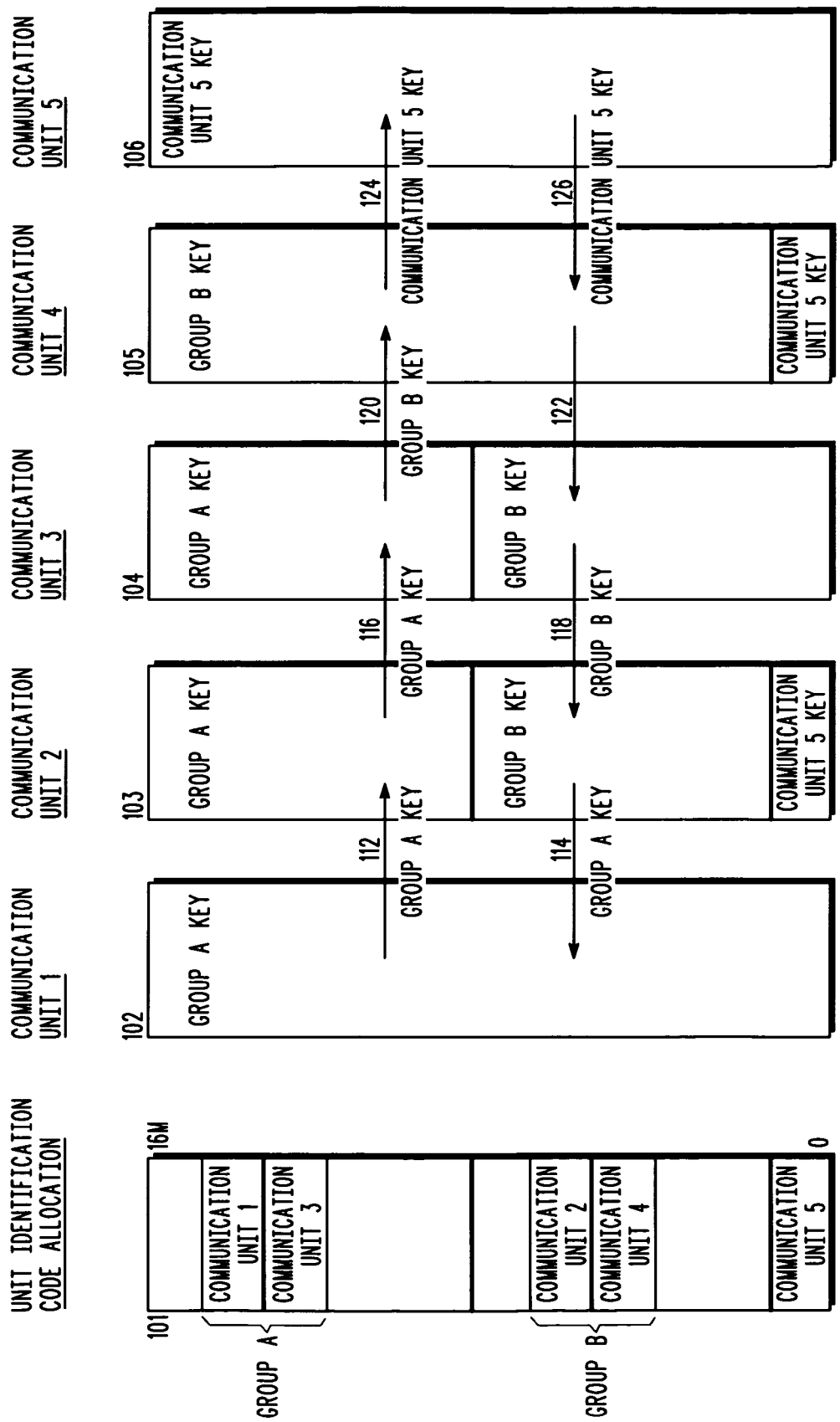
FIG. 2 shows a variety of examples in accordance with the present disclosure.

Also to be noted is that not necessarily all communication units are provisioned with the same encryption keys even though the communication units are members of the same group. FIG. 2 illustrates an example of a map of unit identification code allocations for different groups, and examples of the encryption key association maps provisioned for the different communication units within the groups. In this example, the communication units each have corresponding unit identification codes and are clustered into groups having corresponding group unit identification codes. Two separate groups are illustrated, identified as Group A and Group B, however, there can be any number of user groups and any number of communication units within each group. FIG. 2 illustrates an example of association of keys to unit or group identification codes according to this disclosure. Identity map 101 shows the allocation of unit identification codes for communication Units 1, 2, 3, 4 and 5 within the total range of identification codes within a system. Key map 102 shows the association of keys provisioned in Communication Unit 1 to the identification codes of the communication units. Thus, according to key map 102, Communication Unit 1 is provisioned such that the Group A Key is associated with the identification codes of all Communication Units. In other words, Communication Unit 1 is provisioned with the Group A Key as the default key for use when communicating with all other communication units. Key map 103 shows the association of keys provisioned in Communication Unit 2 to the identification codes of the communication units. Thus, according to key map 103, Communication Unit 2 is provisioned such that the Group A Key is associated with the identification codes of Communication Units 1 and 3, the Group B Key is associated with the identification codes of Communication Units 2 and 4, and the Communication Unit 5 Key is associated with the identification code of Communication Unit 5. Key map 104 shows the association of keys provisioned in Communication Unit 3 to the identification codes of the communication units. Thus, according to key map 104, Communication Unit 3 is provisioned such that the Group A Key is associated with the identification codes of Communication Units 1 and 3, and the Group B Key is associated with the identification codes of Communication Units 2, 4 and 5. Key map 105 shows the association of keys provisioned in Communication Unit 4 to the identification codes of the communication units. Thus, according to key map 105, Communication Unit 4 is provisioned such that the Group B Key is associated with the identification codes of Communication Units 1, 2, 3 and 4, and the Communication Unit 5 Key is associated with the identification code of Communication Unit 5. Key map 106 shows the association of keys provisioned in Communication Unit 5 to the identification codes of the communication units. Thus, according to key map 106, Communication Unit 5 is provisioned such that the Communication Unit 5 Key is associated with the identification codes of all Communication Units. In other words, Communication Unit 5 is provisioned with the Communication Unit 5 Key as the default key for use when communicating with all other communication units.

In accordance with the exemplary allocation of unit identification codes in identity map 101 in FIG. 2, Communication Units 1 and 3, each having an unit identification code, are also members of Group A and may receive transmissions as members of group A which are transmitted to a specific group A identification code. Communication Units 2 and 4, each having an unit identification code, are also members of Group B and may receive transmissions as members of group B which are transmitted to a specific group B identification code. Such allocation is well known in the art, and will not be discussed in detail in this disclosure.

In a present example, all communication units in Group A are provisioned such that their unit identification codes are associated with a Group A Key, thus allowing Communication Units 1 and 3 to transmit encrypted transmissions to each other, as well as to other communication units whose unit identification codes are associated with the same Group A Key. Similarly, Communication Units 2 and 4 in Group B are provisioned such that their unit identification codes are associated with a Group B Key, thus allowing Communication Units 2 and 4 to transmit encrypted transmissions to each other, as well as to other communication units whose unit identification codes are associated with the same Group B Key. Communication Unit 5 is not a member of Group B, and has not been provisioned with a Group B key, however, it may occasionally need to send encrypted transmissions to members of Group B; Communication Unit 5 has been provisioned only with its own individual Communication Unit 5 Key.

In addition to each communication unit being provisioned with encryption keys associated with their respective individual and/or group unit identification code, at least some of the communication units, such as Communication Units 2, 3, and 4 are provisioned with encryption keys associated with group or individual unit identification codes of other communication units. Provisioning some of the communication units with encryption keys associated with unit identification codes of other communication units allows for interoperability among communication units belonging to different groups.

In another example illustrated in FIG. 2, Communication Unit 2, in addition to being provisioned with its own Group B Key, is also provisioned with Group A Key as illustrated in key map 103. Group A Key is an encryption key associated with Group A, and allows Communication Unit 2 to communicate securely with Communication Units 1 and 3 of Group A, either individually or as a group transmission, as well as other communication units of Group A that are provisioned with the Group A Key. In addition, it is contemplated that the Group A Key may also allow Communication Unit 2 to secure communications with other communication units that are not members of Group A, but have corresponding Group A Key provisioned therein.

Similarly, Communication Unit 3 has been provisioned with Group B Key, which is the encryption key of Group B as illustrated in key map 104. Group B Key allows Communication Unit 3 to communicate securely with Communication Units 2 and 4, as well as other communication units of Group B that are provisioned with Group B Key. In addition, it is contemplated that Group B Key may also allow Communication Unit 3 to secure communications with other communication units that are not members of Group B, but have corresponding Group B Key provisioned therein.

If the communication units do not have an encryption key in common, they are unable to communicate securely. Furthermore, if the communication units do have an encryption key in common, but the encryption key is not associated with the corresponding unit identification code, they are unable to communicate securely. In both of these cases, however, the communication units may still be able to communicate in the clear, if provisioned to do so. For example, Communication Unit 1 is provisioned with Group A Key, but not with Group B Key, as illustrated in key map 102. Therefore, Communication Unit 1 may only communicate securely with other communication units associated with a Group A Key or communication units that are provisioned with the Group A key associated with Communication Unit 1. Communication Unit 1 can, however, communicate openly with any communication unit with unencrypted or clear transmissions. Similarly, Communication Unit 4 is provisioned with Group B Key and Communication Unit 5 Key, as illustrated in key map 105. Therefore, Communication Unit 4 may only communicate securely with other communication units associated with the Group B Key or to the Communication Unit 5 Key or communication units that are provisioned with the Group B key associated with Communication Unit 4. Communication Unit 4 can, however, communicate openly with any communication unit with unencrypted or clear transmissions.

FIG. 2 illustrates various examples with selected communication units having group keys and individual communication unit keys, and selected communication units having only one or the other. The first example involves Communication Unit 1 initiating an encrypted transmission 112 to Communication Unit 2. Communication Unit 1 transmits the encrypted transmission 112 to Communication Unit 2, and because Communication Unit 1 is provisioned only with Group A Key, all encrypted transmissions from and to Communication Unit 1 must use Group A Key or the transmission cannot be processed.

On receipt of the transmission 112 from Communication Unit 1, in accordance with the present disclosure, Communication Unit 2 attempts to validate the encrypted transmission by comparing the encryption key used by Communication Unit 1 to encrypt the transmission 112 to the encryption key it has associated with its unit identification code, the Group B Key (i.e., the encryption key Communication Unit 2 normally uses to decrypt transmissions). However, because the transmission 112 is encrypted using the Group A Key, the validation fails. Communication Unit 2 subsequently attempts to validate the encrypted transmission by comparing the encryption key used by Communication Unit 1 to encrypt the transmission to the encryption key it has provisioned as being associated with Communication Unit 1. Communication Unit 2 has been provisioned, prior to the transmission, with a table associating Communication Unit 1 with the Group A Key.

Since both encryption keys match, Communication Unit 2 validates the encrypted transmission 112, and processes the transmission further, if it chooses to do so. Thus, having failed to validate the encrypted transmission by proving that the transmitting communication unit used the correct encryption key when using its own associated key, the Group B key, Communication Unit 2 successfully validated the encrypted transmission when using the provisioned key it had associated with the unit identification code of Communication Unit 1, in this case Group A Key.

It should be noted that if Communication Unit 2 was not provisioned with the Group A Key associated with Communication Unit 1 prior to Communication Unit 1 transmitting the encrypted transmission 112, Communication Unit 2 would not have been able to process the transmission 112 further, even if Communication Unit 2 was provisioned with the Group A Key associated with Communication Unit 3. Communication Unit 2 does not search its repertoire of encryption keys to find a matching key, nor does an exchange of keys occurs over the control plane. Instead, Communication Unit 2 does not process the transmission further if the encryption key used by Communication Unit 1 to encrypt the transmission is not associated with Communication Unit 2 or Communication Unit 1, as provisioned in Communication Unit 2.

In response, Communication Unit 2 may respond to Communication Unit 1 using Group A Key to encrypt the transmission or using clear communications. In the present example, Communication Unit 2 responds 114 to Communication Unit 1 using Group A Key since Communication Unit 2 was provisioned with Communication Unit 1 being associated with Group A Key.

The second example involves Communication Unit 2 initiating an encrypted transmission 116 to Communication Unit 3. Communication Unit 2 has been provisioned with Group B Key and Group A Key. Communication Unit 2 transmits an encrypted transmission 116 using Group A Key, the key which corresponds to what Communication Unit 2 has associated with Communication Unit 3. On receipt of the encrypted transmission, Communication Unit 3 attempts to validate the encrypted transmission by comparing the encryption key used by Communication Unit 2 to encrypt the transmission 116 to the encryption key it has associated with its unit identification code, in this case Group A Key. In this second example, because Communication Unit 2 used the encryption key that Communication Unit 3 has associated with Communication Unit 3, Communication Unit 3 processes the transmission further. As a result, Communication Unit 3 need not attempt validation of the encrypted transmission using the encryption key it has associated with Communication Unit 2.

When responding to transmission 116, Communication Unit 3 becomes the transmitting communication unit and determines the mode of encryption. Communication Unit 3 may respond with an unencrypted response transmission or an encrypted response transmission. If Communication Unit 3 chooses to respond with an encrypted response transmission, Communication Unit 3 encrypts the response transmission 118 using an encryption key it was provisioned with as being associated with Communication Unit 2, in this case Group B Key. On receipt of the response transmission, Communication Unit 2 attempts to validate the encrypted response transmission 118 by comparing the encryption key used by Communication Unit 3 to encrypt the response transmission 118 to an encryption key it has associated with its own unit identification code; because the response transmission 118 was encrypted using Group B Key, which is the encryption key that Communication Unit 2 has associated with itself, the validation is successful and Communication Unit 2 processes the response transmission 118 further.

The third example illustrated involves Communication Unit 3 initiating an encrypted transmission 120 to Communication Unit 4. Communication Unit 3 encrypts the transmission 120 using an encryption key it was provisioned with as being associated with Communication Unit 4, in this case Group B Key. Communication Unit 4 attempts to validate the encrypted transmission by comparing the encryption key used by Communication Unit 3 to encrypt the transmission 120 to an encryption key its has associated with itself. Since the encryption key used by Communication Unit 3 to encrypt the transmission 120 corresponds to the encryption key Communication Unit 4 has associated with itself, Communication Unit 4 processes the transmission 120 further.

When responding to the encrypted transmission 120, Communication Unit 4 encrypts the response transmission 122 using Group B Key because Communication Unit 4 is provisioned such that all communication units are associated with Group B key, except Communication unit 5. Thus, on receipt of the response transmission 122, Communication Unit 3 attempts to first validate the encrypted transmission by comparing the encryption key used to encrypt the response transmission 122 to an encryption key it has associated with itself, in this case the Group A Key. In this instance, however, the validation fails because the encryption key used by Communication Unit 4 does not match the encryption key that Communication Unit 3 was provisioned with as being associated with itself. As a result, Communication Unit 3 then attempts to validate the encrypted transmission by comparing the encryption key used to encrypt the transmission 122 to an encryption key Communication Unit 3 has provisioned within that is associated with Communication Unit 4, in this case the Group B key. Because Communication Unit 3 was provisioned with an encryption key associated with Communication Unit 4, in this case the Group B Key, validation by Communication Unit 3 is successful and the transmission 122 is processed further. If, however, Communication Unit 3 was not provisioned with the Group B Key associated with Communication Unit 4, Communication Unit 3 would have deemed that the transmission 122 was invalid and does not process the transmission further, even if Communication Unit 3 was provisioned with the Group B key, but associated with a different communication unit.

Another example, not illustrated, involves Communication Unit 4 attempting to send an encrypted transmission to Communication Unit 1. Communication Unit 4 encrypts the transmission using the Group B Key because Communication Unit 4 is provisioned such that all communication units are associated with Group B key, except Communication unit 5. On receipt, Communication Unit 1 first attempts to validate the encrypted transmission by comparing the encryption key used to encrypt the transmission to the Group A Key it has associated with its unit identification code. Because the transmission was not encrypted using the Group A Key, the validation fails. As a result, in accordance with the present disclosure, Communication Unit 1 attempts to validate the encrypted transmission by comparing the encryption key used to encrypt the transmission to an encryption key it was provisioned with as being associated with Communication Unit 4. In this example, however, since Communication Unit 1 is only provisioned with the Group A Key, Communication Unit 1 associates all other communication units to the Group A Key, including Communication Unit 4. As a result, the validation fails again and the transmission is not processed further.

Finally, an individual communication unit could encrypt a transmission to several or all members of a group simultaneously using an encryption key associated with its individual unit identification code. For example, in FIG. 2, Communication Unit 5 encrypts a transmission 126 to all communication units who are members of Group B simultaneously. To encrypt the transmission 126, however, Communication Unit 5 uses its only associated encryption key, in this case, Communication Unit 5 Key. Communication Units 2 and 4, on receipt of the transmission, first attempt to validate the encrypted transmission by comparing the encryption key used to encrypt the transmission 126 to an encryption key they have associated with their group, i.e., the Group B Key, Validation by Communication Unit 2 fails, as will validation by Communication Unit 4. However, Communication Units 2 and 4 then attempt to validate the encrypted transmission by comparing the encryption key used to encrypt the transmission 126 to an encryption key each has provisioned within that is associated with Communication Unit 5. Because Communication Units 2 and 4 were provisioned with the Communication Unit 5 Key being associated with Communication Unit 5, validation of the encrypted transmission 126 by both Communication Units 2 and 4 is successful and the transmission 126 is processed further.

If Communication Units 2 and 4 want to send an encrypted transmission back to Communication Unit 5 (i.e., individual communication), both communications units encrypt the response transmission using the encryption key provisioned in their respective communication units as being associated with Communication Unit 5, in this case the Communication Unit 5 Key. Upon receipt, since the response transmission 124 is encrypted, Communication Unit 5 follows the method of the present disclosure, first attempting to validate the encrypted transmission by comparing the encryption key used to encrypt the transmission to the encryption key it has provisioned as being associated to its own unit identification code, in this case, Communication Unit 5 Key; since the transmission was encrypted with Communication Unit 5 Key, the transmission 124 is processed further. This is convenient in situations where a communication unit is not allowed to have the group key but in an emergency, for example, the communication unit can be heard by the group. If, however, for example, Communication Unit 2 wants to send the response transmission to Group B (a group communication as opposed to an individual communication), Communication Unit 2 encrypts the response transmission using the encryption key associated with Group B, in this case the Group B Key. Since Communication Unit 5 is a member of Group B, it receives the encrypted response transmission, however, it is unable to process the response transmission further because it is not provisioned with the Group B Key.

In conclusion, the present disclosure facilitates secured communications between different groups or communication units even when the uses of encryption keys are provisioned differently. It limits the amount of interference possible by third parties, as well as owners and operators of the system infrastructure, and provides a systematic, logical approach to receiving and validating transmissions.

While the present invention is susceptible of embodiment in various forms, there is shown in the drawings and is described a presently preferred embodiment with the understanding that the present disclosure is to be considered an exemplification of the invention and is not intended to limit the invention to the specific embodiment illustrated. For example, the receiving communication unit may compare the encryption key used to encrypt the transmission to an encryption key associated with the transmitting communication unit first, and then to an encryption key associated with the receiving communication unit second, if necessary. Thus, in such an alternative embodiment, the receiving communication unit receives an encrypted transmission from a transmitting communication unit, wherein the encrypted transmission was encrypted by the transmitting communication unit using a first encryption key. The receiving communication unit compares the first encryption key to an encryption key it has associated with the transmitting communication unit. If the first encryption key matches the encryption key it has associated with the transmitting communication unit, the receiving communication unit processes the encrypted transmission further. If, however, the first encryption key does not match the encryption key it has associated with the transmitting communication unit, the receiving communication unit compares the first encryption key to an encryption key it has associated with itself. If the first encryption key matches the encryption key the receiving communication unit has associated with itself, the receiving communication unit processes the encrypted transmission further; otherwise, the receiving communication unit does not process the encrypted transmission further.

Yet, another example is if the transmitting communication unit is not provisioned with an encryption key associated with receiving communication unit, then the transmitting communication unit encrypts the transmission using an encryption key it has associated with its own unit identification code. Upon receipt, the receiving communication unit attempts to validate the transmission as described above in the detailed description.

It should be further understood that the title of this section of this specification, namely, "Detailed Description of The Disclosure", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method to allow secure communication among communication units, the method comprising, at a destination communication unit:
   receiving an encrypted transmission from a source communication unit, wherein the encrypted transmission was encrypted by the source communication unit using a source encryption key;
   validating the encrypted transmission by:
      first:
         identifying a first encryption key mapped within the destination communication unit as a default encryption key for the destination communication unit and associated with an identity of the destination communication unit;
         comparing the source encryption key to the first encryption key and determining if the source encryption key matches the first encryption key associated with the destination communication unit; and second, if the source encryption key does not match the first encryption key:

identifying a second encryption key mapped within the destination communication unit as associated with an identity of the source communication unit;

determining if the second encryption key is available; and if the second encryption key is available, comparing the source encryption key to the second encryption key, and determining if the source encryption key matches the second encryption key; and if it is determined that the source encryption key matches one of the first encryption key and the second encryption key, the destination communication unit processing the encrypted transmission, otherwise, the destination communication unit not processing the encrypted transmission further using any other encryption keys.

2. The method of claim 1, further comprising the step of, if the first encryption key does not match the source encryption key, and the second encryption key is not available, not processing the encrypted transmission further using any other encryption keys.

3. The method of claim 1, wherein the first encryption key was selected from a set of encryption keys, that was provisioned within the second communication unit, mapped as being associated with the identity of the destination communication unit.

4. The method of claim 3, wherein the first encryption key was selected from a Cryptogroup or a Storage Location Number associated with the identity of the destination communication unit.

5. The method of claim 1, wherein the first encryption key was selected from a set of encryption keys, that was provisioned within the second communication unit, mapped as being associated with the identity of the source communication unit.

6. The method of claim 5, wherein the first encryption key was selected from a Cryptogroup or a Storage Location Number associated with the identity of the source communication unit.

7. The method of claim 1, wherein, if the source encryption key matches the first encryption key, the step of processing the encrypted transmission further comprises one or more of (i) decrypting the encrypted transmission, (ii) unmuting the encrypted transmission, (iii) indicating a presence of an encrypted transmission, (iv) awaiting input from a user before processing the encrypted transmission further, (v) awaiting input from an application before processing the encrypted transmission further, and (vi) muting the encrypted transmission.

8. The method of claim 1, wherein, if the source encryption key matches the second encryption key, the step of processing the encrypted transmission further comprises one of (i) decrypting the encrypted transmission, (ii) unmuting the encrypted transmission, (iii) indicating a presence of an encrypted transmission, (iv) awaiting input from a user before processing the encrypted transmission further, (v) awaiting input from an application before processing the encrypted transmission further, and (vi) muting the encrypted transmission.

9. The method of claim 1, further comprising the step of transmitting a response to the encrypted transmission to the source communication unit that is encrypted with a third encryption key, wherein the third encryption key is mapped within the destination communication device as associated with the source communication device.

10. The method of claim 9, wherein the first key and the third key are the same key.

11. The method of claim 9, wherein the first key and the third key are different keys.

12. The method of claim 1, further comprising the steps of determining that no mapping is available between the source communication device and a third encryption key, and responsively transmitting a response to the encrypted transmission to the source communication unit that is encrypted with a fourth encryption key mapped within the destination communication unit as an encryption key associated with the destination communication unit.

13. The method of claim 1, wherein the encrypted transmission is part of an individual communication between the source and destination devices.

14. The method of claim 1, wherein the encrypted transmission is part of a group communication between the source communication unit, destination communication unit, and at least one additional other communication unit.

15. The method of claim 1, further comprising the step of transmitting a response to the encrypted communication to the source communication unit that is unencrypted.

16. The method of claim 1, further comprising:

receiving an identifier relating to the source encryption key, wherein the identifier allows the destination communication unit to determine the source encryption key that was used to encrypt the encrypted transmission.

* * * * *